United States Patent [19]
Stone, Jr.

[11] Patent Number: 5,923,634
[45] Date of Patent: *Jul. 13, 1999

[54] OPTICAL DISC HAVING SURFACE PORTIONS CONFIGURED TO EACH REPRESENT AT LEAST TWO BITS OF DATA

[76] Inventor: Jack D. Stone, Jr., 6002 Ellsworth Ave., Dallas, Tex. 75206

[*] Notice: This patent issued on a continued prosecution application filed under 37 CFR 1.53(d), and is subject to the twenty year patent term provisions of 35 U.S.C. 154(a)(2).

[21] Appl. No.: 08/807,016

[22] Filed: Feb. 26, 1997

[51] Int. Cl.$^6$ ................................ G11B 7/00; G11B 3/70
[52] U.S. Cl. ........................................ 369/112; 369/275.1
[58] Field of Search ..................... 369/100, 112, 369/120, 93, 95, 102, 109, 119, 275.1, 275.3, 275.4

[56] References Cited

U.S. PATENT DOCUMENTS 4,550,249  10/1985  Damen et al. ............... 369/120 X

*Primary Examiner*—Paul W. Huber
*Attorney, Agent, or Firm*—Jack D. Stone, Jr.

[57] ABSTRACT

A data storage device having a light source for emitting a beam of light along a directed path, and an array of light sensors, each of which light sensors corresponds to a predetermined quanta of data. A disc is configured, and positioned relative to the light source and the array of light sensors, for receiving the beam of light and redirecting the path of the received beam of light to a particular one of the light sensors, wherein the array of light sensors is responsive to the reception of the beam of light for generating a signal indicative of the particular light sensor which receives the beam of light, thereby indicating the quanta of data corresponding to the light sensor.

22 Claims, 2 Drawing Sheets

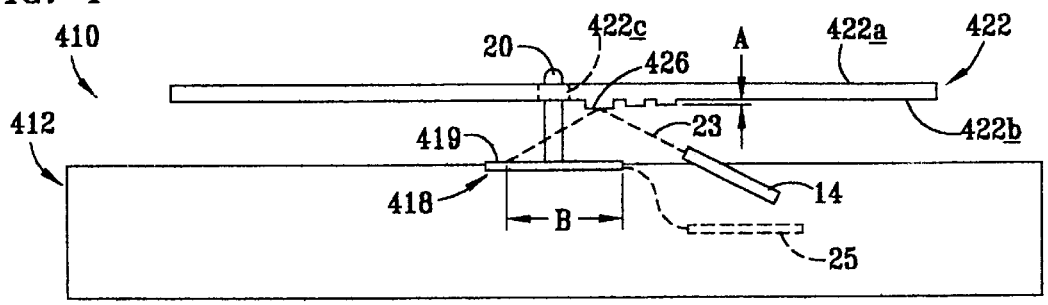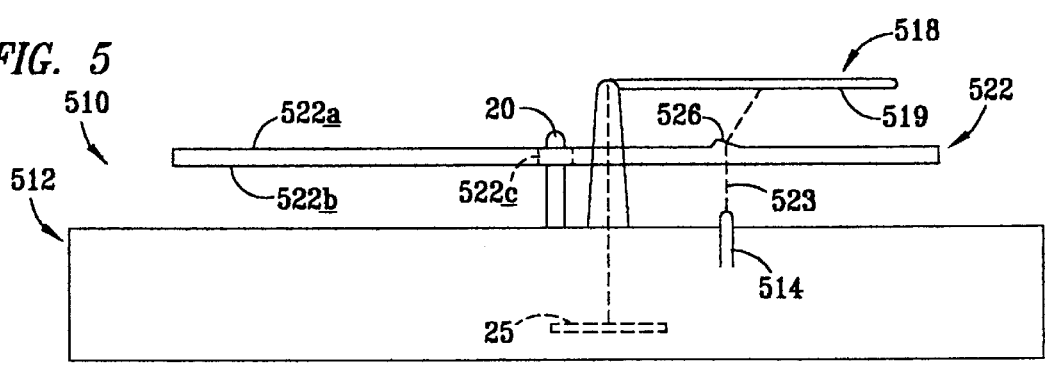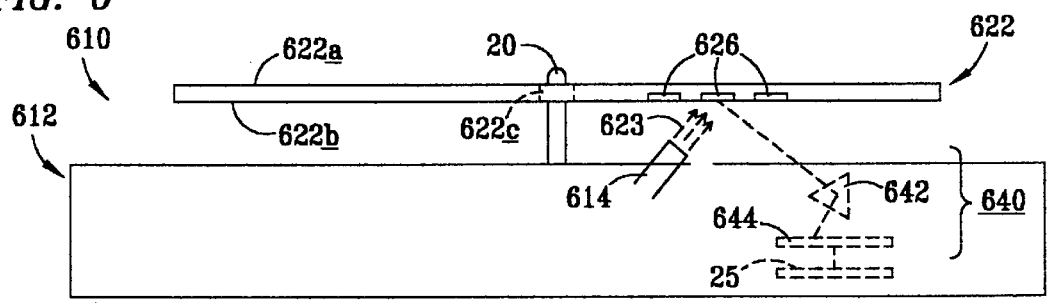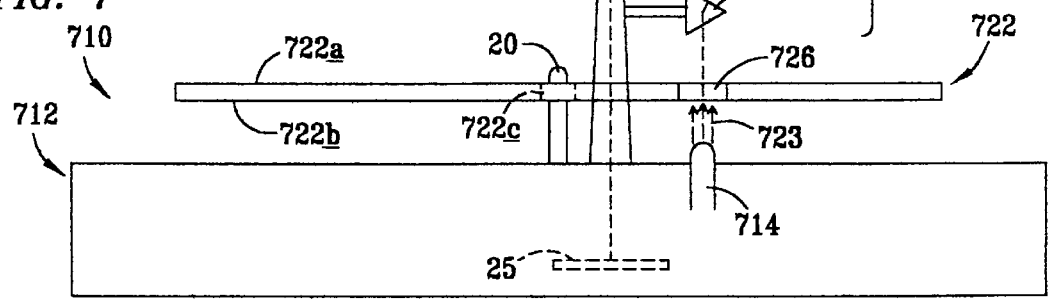

OPTICAL DISC HAVING SURFACE PORTIONS CONFIGURED TO EACH REPRESENT AT LEAST TWO BITS OF DATA

FIELD OF THE INVENTION

The present invention relates generally to a system for storing data and, more particularly, to such a system for storing data on an optical medium.

BACKGROUND OF THE INVENTION

A number of conventional techniques are available for storing data. For example, data may be stored in printed form on paper, in magnetic form on magnetic tape or floppy or hard discs, or in optical form on compact-disc read-only-memories (CD-ROM's). Of particular interest herein are optical media, such as CD-ROM's, which typically comprise discs having a diameter of 120 mm and a thickness of 1.2 mm. A spiral track is formed on the disc and includes a multitude of "pits" along the track where there is located either a nonreflective surface or a flat reflective surface portion representing the two binary states of "0" and "1" which define "bits". The bits are combined in a conventional manner to form bytes for representing data. By spacing the tracks approximately 1.6 microns apart and the pits approximately 0.834 microns apart, a CD-ROM can hold as much as 682 megabytes (MB) of data. The pits are "read" by an infrared laser having a wavelength of approximately 780–790 nanometers (nm). This technology is well known and, therefore, will not be described in further detail herein.

There are many data storage applications, such as full length video movies and libraries of books, however, which require more than 682 MB of data storage. For such applications, new techniques have been developed to pack increased numbers of pits, and hence data, onto a disc, without increasing the size of the disc. These techniques, implemented on digital versatile discs, or digital video discs (DVD) ROM's, use discs of the same physical size as CD-ROM's, but typically space the tracks 0.74 microns apart, and the pits 0.4 microns apart. The pits are read using red-laser diodes having wavelengths of approximately 635–650 nm. The pits are, additionally, formed in one or two data layers on one or two sides of the disc. By utilizing two layers of pits on each side of a disc, up to 17 gigabytes (GB, i.e., 1,000 MB) of data may be stored on a single disc, thereby providing on a single DVD-ROM about 25 times the maximum storage capacity of conventional CD-ROM's.

While the foregoing technologies enable large quantities of data to be stored on a disc by increasing the number of pits on a disc, the data represented by a single pit is still limited to a single bit. It can be appreciated that this limits not only the storage capacity of the disc, but also the rate at which data can be read from the disc. Thus, for example, if a disc has the capacity to hold 1,000 pits, then no more than 1,000 bits can be stored on the disc; furthermore, if the pits can be read a rate of 10 pits/second then data is likewise limited to being read at 10 bits/second. To circumvent the storage problems, some systems comprise multiple CD-ROM or DVD-ROM drives. Such a solution, however, is not only expensive and voluminous, but it also does not resolve the problem of the relatively limited data retrieval rates.

Therefore, what is needed is a system and method for increasing not only the data storage capacity of an optical medium, but also the rate at which the stored data may be read.

SUMMARY OF THE INVENTION

The present invention, accordingly, provides an optical data storage system and method for increasing not only the data storage capacity of individual pits in optical media, but also the rate at which the stored data may be read. Accordingly, the system of the present invention comprises an optical storage device having a light source for emitting a beam of light along a directed path, and an array of light sensors, each of which light sensors corresponds to a predetermined quanta of data, or combination of bits. A disc is configured, and positioned relative to the light source and the array of light sensors, for receiving the beam of light and redirecting the path of the received beam of light to a particular one of the light sensors, wherein the array of light sensors is responsive to the beam of light for generating a signal indicative of the particular light sensor which receives the beam of light, thereby indicating the quanta of data corresponding to the light sensor.

Alternatively, a method for implementing the present invention includes the steps of directing a beam of light to a disc; redirecting with the disc the beam of light to a particular light sensor in an array of light sensors, each of which light sensors corresponds to a particular combination of bits of data; and generating a signal indicative of the particular light sensor, the signal being indicative of the particular light sensor and the particular series of bits of data associated with the particular light sensor.

An advantage achieved with the present invention is that it permits each pit in an optical storage device to carry multiple bits of data, rather than being limited to carrying single bits of data as in conventional systems. For example, eight bits, or one byte, of data may be stored by each pit.

Another advantage achieved with the present invention is that data may be read much faster than is possible with conventional systems. Specifically, the rate at which data may be read is increased in direct proportion to the increase in the number of bits represented by each pit.

BRIEF DESCRIPTION OF THE DRAWINGS

FIGS. 4–7 are alternate embodiments of the present invention.

DETAILED DESCRIPTION

Figure 1:
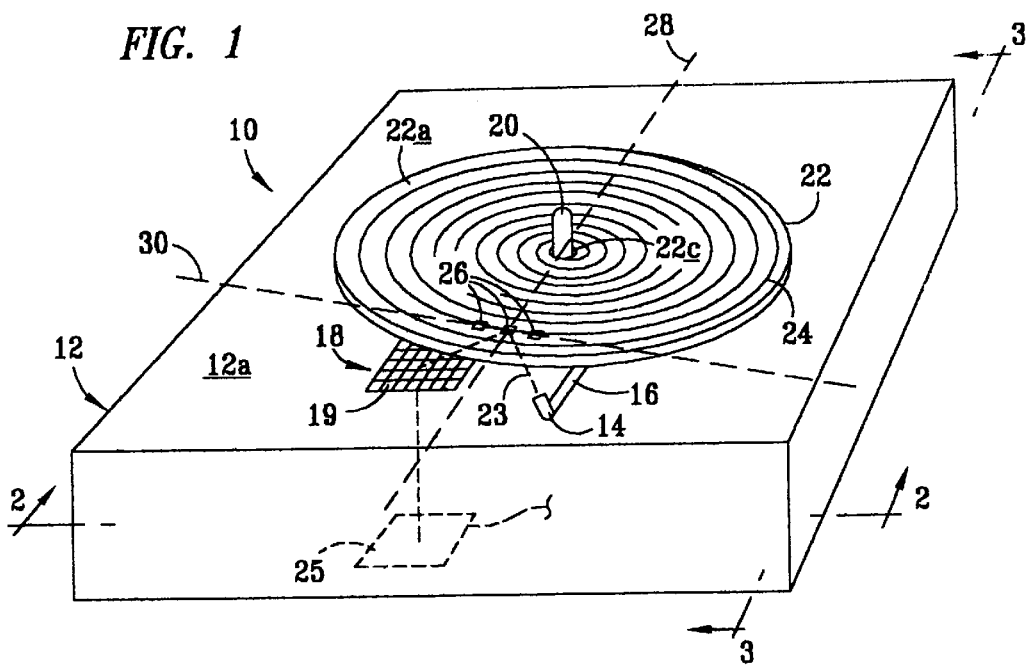
FIG. 1 is a perspective view of an optical data storage system embodying features of the present invention.

Referring to FIG. 1 of the drawings, the reference numeral 10 generally designates a data storage system embodying features of the present invention. The system 10 includes a base member 12 having a laser light source 14 slidably mounted on a linear track 16 formed on the base member. A photoreceptor array 18 is mounted on the top surface 12a of the base member 12, and an upwardly extending spindle 20 is drivingly connected to a motor (not shown), for supporting and rotating, in a conventional manner, a disc 22 mounted on the spindle.

The laser light source 14 is preferably a conventional red-laser diode having a wavelength of approximately 635–650 nm, though other laser light sources may be utilized, such as an infrared laser having a wavelength of approximately 780–790 nanometers.

The photoreceptor array 18 is positioned on the surface of the base member 12 for receiving a beam 23 of laser light emitted from the light source 14 and reflected off of the disc 22, as described below. The array 18 includes an integral charge-coupled device (CCD) having 256 photoreceptor sensor elements 19 arranged in a 16×16 array and coupled to data encoder/decoder circuitry 25.

While not shown in detail, the photoreceptor array 18 is structurally similar to conventional CCD's (e.g., as found in "cam corders") and, accordingly, generally includes a metal oxide semiconductor (MOS) capacitor with an electrode attached on top of silicon dioxide on a semiconductor substrate surface. When voltage is supplied between the electrode and the substrate, a depletion layer is formed at the silicon dioxide and the semiconductor interface, resulting in a potential well of low energy ranking for the minority carrier. If the signal charge generated by laser light radiation is injected into the potential well, the signals are temporarily stored and memorized as analog quantities. Because the operation of CCD's is well known to those skilled in the art, the array 18 will not be described in any further detail herein.

Figure 2:
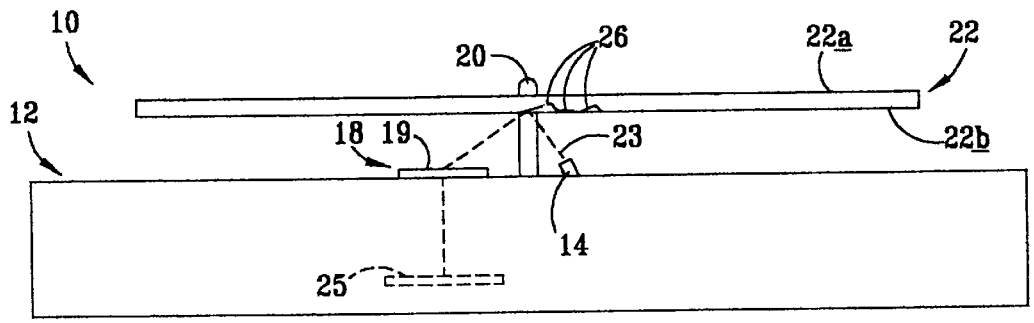
FIG. 2 is an elevation view of the system of FIG. 1 taken along the line 2—2 of FIG. 1.

The disc 22 defines a top side 22a, a bottom side 22b, and a hole 22c centrally formed therethrough for aligning the disc on the spindle 20 in a conventional manner. A spiral track 24 is formed on the bottom side 22b of the disc 22 and spirals outwardly from the hole 22c. A multitude of discrete reflective surface portions 26 (only three of which are shown in FIG. 2) are spaced along the track 24. For each discrete reflective surface portion 26, two orthogonal axes are defined, namely, a radial axis 28 extending radially from the hole 22c through the reflective surface portion, and a tangential axis 30, extending tangentially to the spiral track 24 at the respective surface portion. The discrete reflective surface portions 26 are substantially planar and are angularly oriented at any one of sixteen spaced angles about each of the orthogonal axes 28 and 30. It can be appreciated that each reflective surface portion 26 may be oriented at any one of $16^2$, or 256, different angular, or spatial, orientations, and thereby represent 8 bits (since $256=2^8$), or 1 byte of data.

The linear track 16 is configured and oriented in a conventional manner for translating the laser light source 14 along a path that is parallel to the radial axis of the reflective surface portion 26 to which the laser light source is directed.

Figure 3:
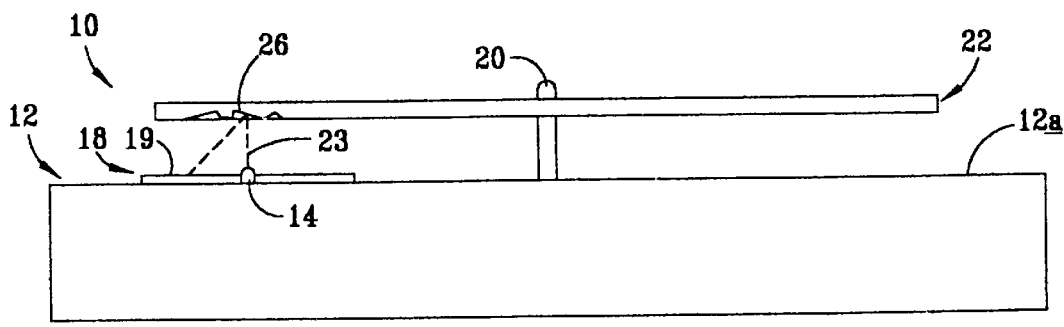
FIG. 3 is an elevation view of the system of FIG. 1 taken along the line 3—3 of FIG. 1.

FIGS. 2 and 3 show discrete reflective surface portions 26 taken along the tangential and radial axes 30 and 28, respectively, of FIG. 1. As shown, a surface portion 26 is positioned at an angular orientation for reflecting laser light to a particular one of the 256 photoreceptor sensor elements 19. It can be appreciated that, in a like manner, laser light from the source 14 may be directed to any one of the 256 photoreceptor elements 19 by controlling the angle of the reflective surface portion 26 about the orthogonal radial and tangential axes 28 and 30, respectively.

In operation, the disc 22 is rotated on the spindle 20 and the laser light source 14 is positioned as desired along the linear track 16 for directing the laser beam 23 to the reflective surface portions 26 on the spiral track 24 as the disc is rotated. The laser beam 23 is then sequentially reflected off each of the reflective surface portions 26, and from each surface portion that it is reflected from, it impinges one of the 256 photoreceptor elements 19. The encoder/decoder of the photoreceptor array 18 then generates an 8-bit (or 1-byte) signal, indicative of the element 19 that is impinged, to the circuitry 25 which processes the 8-bit signal in any conventional manner desired. The signal may, for example, be used to represent text, or a multimedia video display.

The embodiments of FIGS. 4–7 are similar to the embodiment of FIGS. 1–3 and identical components are given the same reference numerals. Accordingly, in FIG. 4 of the drawings, the reference numeral 410 generally designates a data storage system having the base member 412 and the laser light source 14 slidably mounted on the linear track (not shown) formed on the base member. A photoreceptor array 418 is mounted on the top surface of the base member 412, and the upwardly extending spindle 20 is drivingly connected to a motor (not shown), for supporting and rotating, in a conventional manner, a disc 422 mounted on the spindle.

The photoreceptor array 418 is positioned on the top surface of the base member 12 for receiving a beam 23 of laser light emitted from the light source 14 and reflected off of the disc 422, as described below. The array 418 includes an integral charge-coupled device (CCD) having 256 photoreceptor sensor elements 419, similar to the elements 19, but arranged in a 1×256 linear array and coupled to a data encoder/decoder (not shown).

The disc 422 defines a top side 422a, a bottom side 422b, and a hole 422c centrally formed therethrough for aligning the disc on the spindle 20 in a conventional manner. A spiral track is formed on the bottom side 422b of the disc 422 and spirals outwardly from the hole 422c. A multitude of discrete reflective surface portions 426 (only three of which are shown in FIG. 4) are spaced along the spiral track. The discrete reflective surface portions 426 are substantially planar and are linearly downwardly displaced at one of 256 discrete displacements from the top surface 422b of the disc 422 to thereby represent 8 bits (since $256=2^8$), or 1 byte of data. It can be appreciated that a laser light beam 23 from the source 14 may be directed to any one of the 256 photoreceptor elements 419 by controlling the displacement of the reflective surface portion 426 from the top surface 422a.

In operation, the disc 422 is rotated on the spindle 20 and the laser light source 14 is positioned as desired along the linear track 16 for directing the laser beam 423 to the reflective surface portions 426 on the spiral track 424 as the disc is rotated. The laser beam 23 is then sequentially reflected off each of the reflective surface portions 426, and from each surface portion that it is reflected from, it impinges one of the 256 photoreceptor elements 419. The particular element 419 that is impinged by the laser beam 23 is determined by the displacement A of the surface portion 426 from the plane 14b; as the displacement A is increased, a distance B along the linear array 418 is decreased. The distance B is determinative of which photoreceptor element 419 is impinged. Once an element 419 is impinged, a signal is generated indicative of the impinged element as described above with respect to the embodiment of FIGS. 1–3. The encoder/decoder of the photoreceptor array 418 then generates an 8-bit (or 1-byte) signal, indicative of the element 419 that is impinged, to circuitry 25 which processes the 8-bit signal in any conventional manner desired. The signal may, for example, be used to represent text, or a multimedia video display.

According to an embodiment shown in FIG. 5, the reference numeral 510 generally designates a data storage system having the base member 12 and the vertically oriented laser light source 514 slidably mounted on the linear track (not shown) formed on the base member. A photoreceptor array 518 is mounted on the top surface of the base member 512, and the upwardly extending spindle 20 is drivingly connected to a motor (not shown), for supporting and rotating, in a conventional manner, a transparent disc 522 mounted on the spindle.

The photoreceptor array 518 is positioned above the disc 522 for receiving a beam 23 of laser light which is emitted from the light source 14 and refracted from of the disc 522, as described below. The array 518 includes an integral charge-coupled device (CCD) having 256 photoreceptor sensor elements 519, similar to the elements 19, coupled to a data encoder/decoder.

The disc 522 defines a top side 522a, a bottom side 522b, and a hole 522c centrally formed therethrough for aligning the disc on the spindle 20 in a conventional manner. A spiral track 524 is formed on the top side 522a of the disc 522 and spirals outwardly from the hole 522a. A multitude of discrete refractive surface portions 526 (only three of which are shown in FIG. 5) are spaced along the track 524. For each discrete refractive surface portion 526, two orthogonal axes are defined, namely, the radial axis 28 extending radially from the hole 522c through the reflective surface portion, and the tangential axis 30, extending tangentially to the spiral track 524 at the respective surface portion. The discrete refractive surface portions 526 are substantially planar and are angularly oriented at any one of sixteen spaced angles about each of the orthogonal axes 28 and 30. It can be appreciated that each refractive surface portion 526 may be oriented at any one of $16^2$, or 256, different angular, or spatial, orientations, and thereby represent 8 bits (since $256=2^8$), or 1 byte of data. It can be appreciated that a laser light beam 523 from the source 514 may be directed to any one of the 256 photoreceptor elements 519 by controlling the angle of the refractive surface portion 526 from the top surface 522a.

In operation, the disc 522 is rotated on the spindle 20 and the laser light source 514 is positioned as desired along the linear track 16 for directing the laser beam 523 through the disc 522 and refractive surface portion 526 on the spiral track 524 as the disc is rotated. The laser beam 523 is then sequentially refracted through each of the refractive surface portions 526 to one of the 256 photoreceptor elements 519. The particular element 519 that is impinged by the laser beam 523 is determined by the angular orientation of the surface portion 526. Once an element 519 is impinged, a signal is generated indicative of the impinged element as described above with respect to the embodiment of FIGS. 1–3. The encoder/decoder of the photoreceptor array 518 then generates an 8-bit (or 1-byte) signal, indicative of the element 519 that is impinged, to circuitry 25 which processes the 8-bit signal in any conventional manner desired. The signal may, for example, be used to represent text, or a multimedia video display.

According to the embodiment shown in FIG. 6 of the drawings, the reference numeral 610 generally designates a data storage system having the base member 12 and a laser light source 614 slidably mounted on the linear track 16 formed on the base member. The light source 614 is configured for generating light having a spectrum of at least 256 frequencies, or narrow bands of frequencies, each of which frequencies or bands represents one of $2^8$, or 256, bytes of data. The upwardly extending spindle 20 is drivingly connected to a motor (not shown), for supporting and rotating, in a conventional manner, a disc 622 mounted on the spindle.

The disc 622 defines a top side 622a, a bottom side 622b, and a hole 622c centrally formed therethrough for aligning the disc on the spindle 20 in a conventional manner. A spiral track (not shown) is formed on the bottom side 622b of the disc 622 and spirals outwardly from the hole 622a. A multitude of discrete reflective surface portions 626 (only three of which are shown in FIG. 6) are spaced along the track, each of which surface portions are "colorized" for reflecting light having only a narrow band of frequencies.

A light sensor assembly 640 is positioned for receiving light that is reflected off of the surface portions 626 and for generating a signal indicative of the frequency of light received. The assembly 640 utilizes a prism 642 for redirecting the light according to the frequency of light passing through the prism to a linear array of photoreceptor elements 644 similar to the array 418 for determining the frequency of light. Once an element 644 is impinged, a signal is generated indicative of the impinged element as described above with respect to the embodiment of FIGS. 1–3.

In operation, the disc 622 is rotated on the spindle 20 and the laser light source 614 is positioned as desired along the linear track for directing the laser beam 623 to the reflective surface portions 626 on the spiral track 624 as the disc is rotated. The laser beam 623 is then sequentially reflected off each of the reflective surface portions 626, and from each surface portion that it is reflected from, it passes through the prism 642 and impinges one of the 256 photoreceptor elements 644. Once an element 644 is impinged, a signal is generated indicative of the impinged element as described above with respect to the embodiment of FIGS. 1–3. An encoder/decoder (not shown) generates an 8-bit (or 1-byte) signal, indicative of the element 644 that is impinged, to circuitry 25 which processes the 8-bit signal in a conventional manner. The signal may, for example, be used to represent text, or a multimedia video display.

According to the embodiment shown in FIG. 7 of the drawings, the reference numeral 710 generally designates a data storage system having the base member 12 and a vertically oriented laser light source 714 slidably mounted on the linear track 16 formed on the base member. The light source 714 is configured for generating light having a spectrum of at least 256 frequencies, or narrow bands of frequencies, each of which frequencies or bands represents one of $2^8$, or 256, bytes of data. The upwardly extending spindle 20 is drivingly connected to a motor (not shown), for supporting and rotating, in a conventional manner, a disc 722 mounted on the spindle.

The disc 722 defines a top side 722a, a bottom side 722b, and a hole 722c centrally formed therethrough for aligning the disc on the spindle 20 in a conventional manner. A spiral track (not shown) is formed on the top side 722a of the disc 722 and spirals outwardly from the hole 722c. A multitude of discrete surface portions 726 (only one of which is shown in FIG. 6) are spaced along the spiral track, each of which surface portions are "colorized" for passing light having only a narrow band of frequencies.

A light sensor assembly 740 is positioned for receiving light that passes through the surface portions 726 and for generating a signal indicative of the frequency of light received. The assembly 740 utilizes a prism 742 for redirecting the light according to the frequency of light passing through the prism to a linear array of photoreceptor elements 744 similar to the array 418 for determining the frequency of light. Once an element 744 is impinged, a signal is generated indicative of the impinged element as described above with respect to the embodiment of FIGS. 1–3.

In operation, the disc 722 is rotated on the spindle 20 and the laser light source 714 is positioned as desired along the linear track 16 for directing the laser beam 723 to the surface portions 726 on the spiral track 724 as the disc is rotated. The laser beam 723 is then sequentially refracted from each of the surface portions 726, and from each surface portion that it is refracted from, it passes through the prism 742 and impinges one of the 256 photoreceptor elements 744. Once an element 744 is impinged, a signal is generated indicative of the impinged element as described above with respect to the embodiment of FIGS. 1–3. An encoder/decoder (not shown) generates an 8-bit (or 1-byte) signal, indicative of the element 744 that is impinged, to circuitry 25 which processes the 8-bit signal in a conventional manner. The signal may, for example, be used to represent text, or a multimedia video display.

It is understood that several further variations may be made in the foregoing without departing from the scope of the invention. For example, the CCD may include more or less elements than the 256 elements described above so that more or less than the one byte of data may be stored in each surface portion or pit. The laser light may be of any desirable wavelength and the reflective, refractive, and colorized surface portions may be of any appropriate size, such as sub-micron sizes. Any of a number of conventional techniques may be used to determined the frequency of light reflected from or passed by the colorized surface portion portions 644 or 744. Digital mirror device (DMD) technology may be also incorporated into the manufacture of the present invention as embodied in FIGS. 1–5.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A data storage device comprising an optical disc having a plurality of surface portions, each surface portion being configured for directing a beam of light to a single light sensor selected from an array of light sensors, each light sensor corresponding to a quanta of at least two bits of data.

2. The device of claim 1 wherein the disc defines a plane substantially parallel to the disc, and wherein each surface portion is substantially discrete, planar, and displaced relative to the plane by a displacement corresponding to a quanta of at least two bits of data.

3. The device of claim 2 wherein the displacement is angular.

4. The device of claim 2 wherein each surface portion is reflective.

5. The device of claim 2 wherein at least one axis passes through each surface portion, and each surface portion is angularly displaced about its respective at least one axis.

6. The device of claim 2 further comprising:
   a base member;
   a light source mounted on the base member for emitting the beam of light along a directed path;
   the array of light sensors mounted on the base member, each of which light sensors corresponds to a predetermined quanta of at least two bits of data; and
   a receiver mounted on the base member and configured to receive the disc and sequentially position each surface portion thereof relative to the light source and the array of light sensors to receive the beam of light and redirect the path of the received beam of light to the light sensor corresponding to the displacement of each respective surface portion, the array of light sensors being responsive to the reception of the beam of light for generating a signal indicative of the respective light sensor which receives the beam of light to thereby indicate the predetermined quanta of data corresponding to the respective light sensor.

7. The device of claim 6 wherein each surface portion is reflective and wherein the light source and the array of light sensors are positioned on at least one side of the disc so that the beam of light may sequentially reflect off of each surface portion to the light sensor corresponding to the displacement of each respective surface portion.

8. The device of claim 6 wherein the disc and each surface portion are substantially transparent and wherein the disc is interposed between the light source and the array of light sensors so that the beam of light may enter the disc, sequentially pass through each surface portion, and exit therefrom along a path directed to the light sensor corresponding to the displacement of each respective surface portion.

9. The device of claim 2 wherein the displacement is linear.

10. The device of claim 2 wherein the disc and each surface portion are substantially transparent.

11. The device of claim 1 wherein the beam of light comprises a plurality of frequencies, each frequency corresponding to a quanta of at least two bits of data, wherein each surface portion is configured for passing a selected frequency of light, and the device further comprises;
   a base member;
   a light source mounted on the base member for emitting the beam of light along a directed path, the beam of light comprising a plurality of frequencies, each of which frequencies corresponds to a quanta of at least two bits of data;
   the array of light sensors mounted on the base member, each of which light sensors corresponds to a predetermined quanta of at least two bits of data;
   a receiver mounted on the base member and configured to receive and support the disc;
   a prism positioned on the base member between the disc and the array of light sensors, the receiver being further configured to sequentially position each surface portion of the disc relative to the light source and the array of light sensors to receive the beam of light and pass substantially only a selected frequency of the light through the prism, the prism being configured to direct the selected frequency of light to the light sensor corresponding to the frequency passed by each respective surface portion, the array of light sensors being responsive to the reception of the beam of light for generating a signal indicative of the respective light sensor which receives the beam of light to thereby indicate the predetermined quanta of data corresponding to the respective light sensor.

12. The device of claim 11 wherein the disc is configured for reflecting light of the selected frequency from the disc to the prism.

13. The device of claim 11 wherein the disc is configured for passing light of the selected frequency from the disc to the prism.

14. A data storage device comprising a disc defining a plane substantially parallel to the disc, and a plurality of surface portions, each of which surface portions defines a substantially discrete planar surface portion formed on the disc and displaced relative to the plane by a displacement corresponding to a selected quanta of at least two bits of data.

15. The device of claim 14 wherein the displacement is angular.

16. The device of claim 14 wherein each surface portion is reflective.

17. The device of claim 14 wherein the disc is an optical disc.

18. The device of claim 14 wherein at least one axis passes through each surface portion, and each surface portion is angularly displaced about its respective at least one axis.

19. The device of claim 14 wherein each surface portion is configured for directing a beam of light to a single light sensor selected from an array of light sensors, and wherein the device further comprises:

a base member;

a light source mounted on the base member for emitting the beam of light along a directed path;

the array of light sensors mounted on the base member, each of which light sensors corresponds to a predetermined quanta of at least two bits of data; and a receiver mounted on the base member and configured to receive the disc and sequentially position each surface portion thereof relative to the light source and the array of light sensors to receive the beam of light and redirect the path of the received beam of light to the light sensor corresponding to the displacement of each respective surface portion, the array of light sensors being responsive to the reception of the beam of light for generating a signal indicative of the respective light sensor which receives the beam of light to thereby indicate the predetermined quanta of data corresponding to the respective light sensor.

20. The device of claim 19 wherein each surface portion is reflective and wherein the light source and the array of light sensors are positioned on at least one side of the disc so that the beam of light may sequentially reflect off of each surface portion to the light sensor corresponding to the displacement of each respective surface portion.

21. The device of claim 14 wherein the displacement is linear.

22. The device of claim 14 wherein the disc and each surface portion are substantially transparent.

* * * * *